June 6, 1961  E. J. McCARTNEY ET AL  2,986,966
STABILIZED OPTICAL SYSTEM
Filed Dec. 15, 1958  4 Sheets-Sheet 4
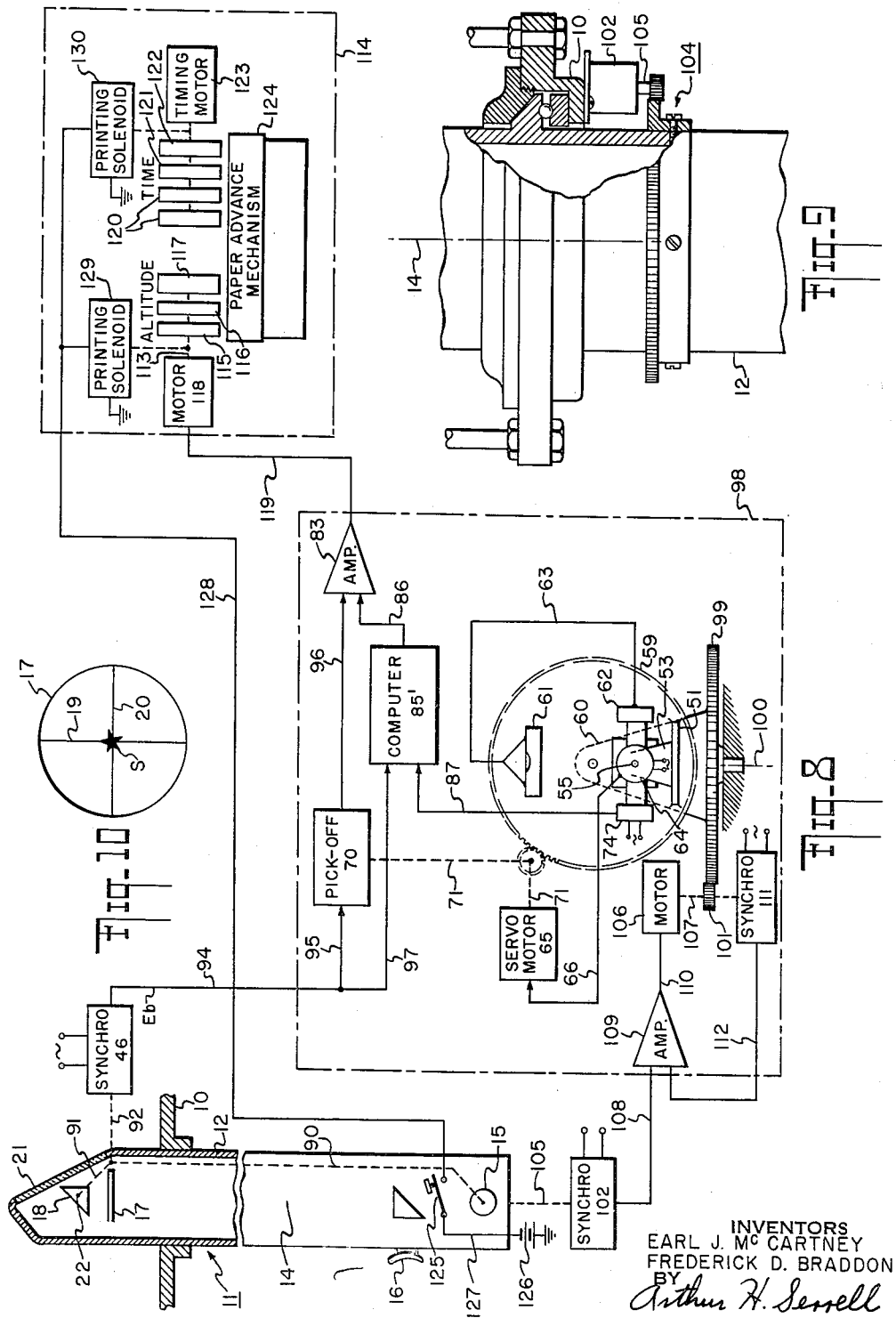
INVENTORS
EARL J. McCARTNEY
FREDERICK D. BRADDON
BY
Arthur H. Serrell
ATTORNEY

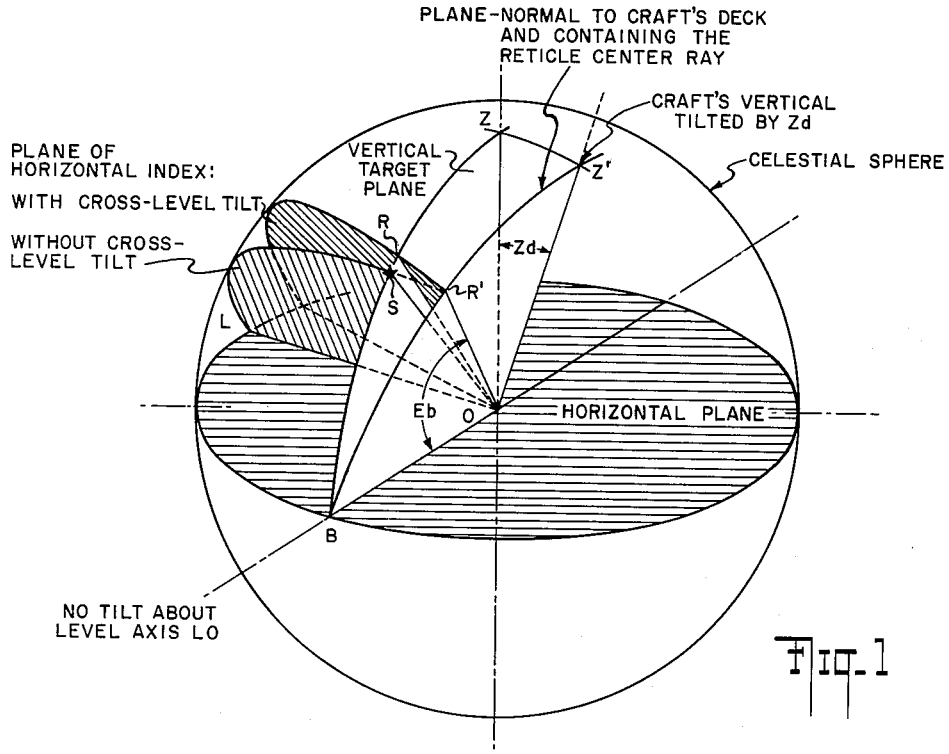
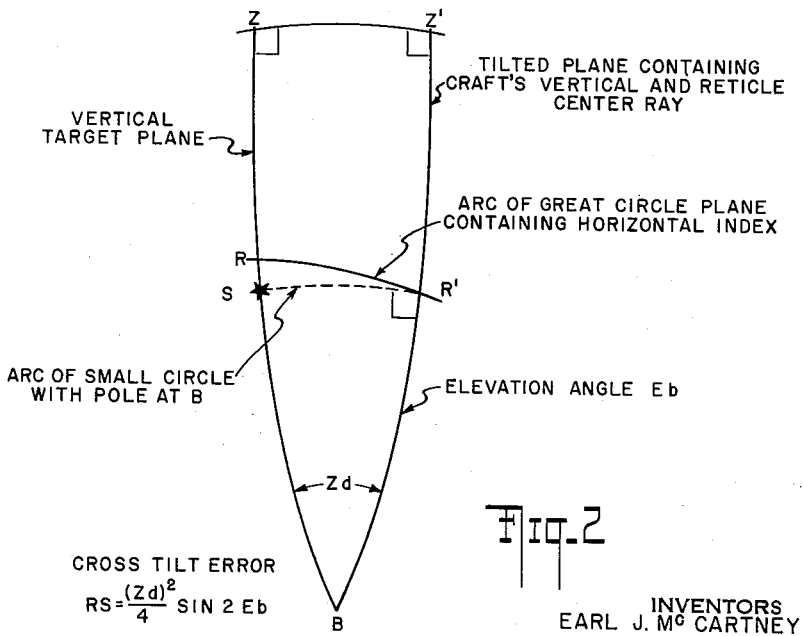

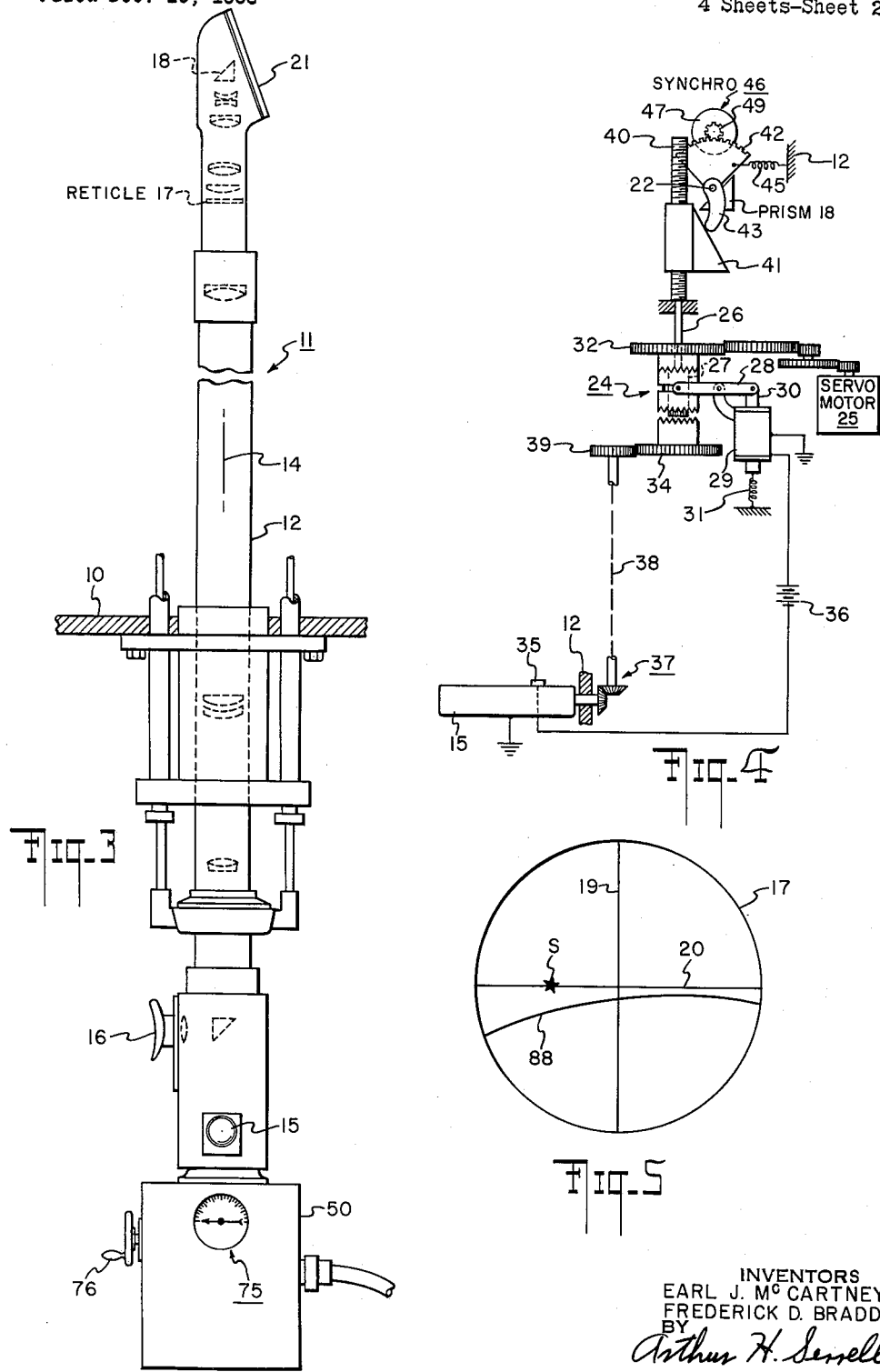

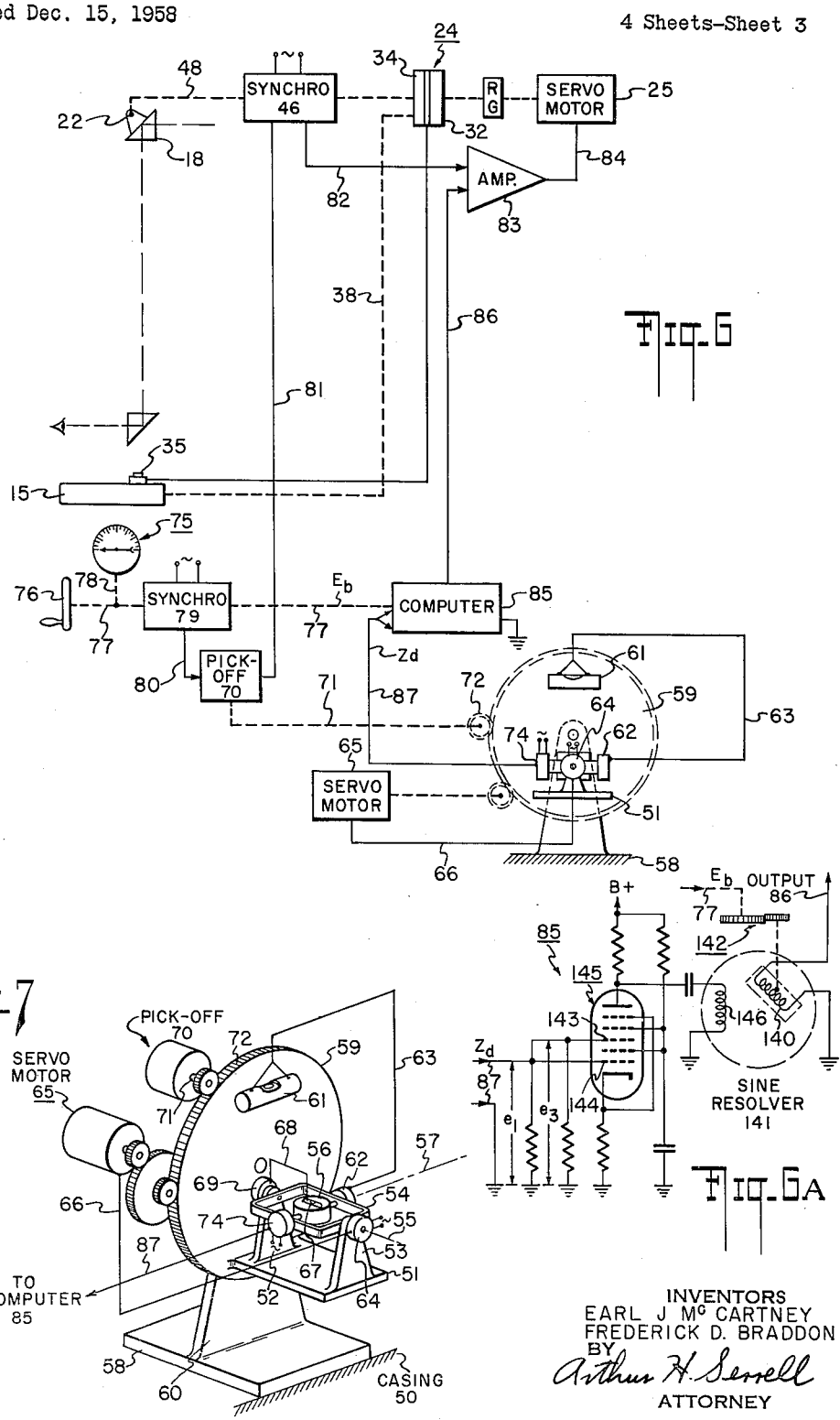

… … …

United States Patent Office 2,986,966
Patented June 6, 1961

2,986,966
STABILIZED OPTICAL SYSTEM

Earl J. McCartney, Rockville Centre, and Frederick D. Braddon, Babylon, N.Y., assignors to Sperry Rand Corporation, Great Neck, N.Y., a corporation of Delaware
Filed Dec. 15, 1958, Ser. No. 780,625
16 Claims. (Cl. 88—2.4)

This invention relates to stabilized optical systems providing a corrected measure of the angle of elevation or altitude of a celestial body such as a star from a sighting point. The optical means of the system is preferably provided by a periscope, the system being particularly useful in celestial navigation of a dirigible craft of the submarine type to obtain an accurate determination of position with the submarine submerged at periscope depth.

When measurements of the celestial altitude of a star are made from a submarine which has seaway motions, it is necessary to counteract or compensate the periscope for the motions of the submarine. In accordance with the present invention, these motions are resolved about level and cross level axes in terms of tilt of the adjustable sighting prism of the periscope rather than of tilt of the deck plane of the submarine from a horizontal plane. Observations are made with the improved system without the necessity of relating the train position of the periscope to the course of the submarine.

Stabilization is provided for the system by a device such as a gyroscopic instrument of the vertical type providing a level reference with respect to the earth. The horizontal reference plane defined by the stabilizing instrument is related to the optical means rather than to the hull of the submarine per se, one of the axes thereof being arranged in constant parallel relation to the axis of the sighting prism of the periscope. This axis is hereinafter referred to as the level axis of the reference. In one embodiment of the invention, the stabilizing means is incorporated in the housing of the periscope and the axes of the components are fixedly related. In another embodiment of the invention, the stabilizing means is remote from the periscope. In this arrangement, the stabilizing means is located on a table with freedom of movement about an axis parallel to the slewing axis of the periscope and is slaved to the periscope to maintain the relation between the components.

The component of tilt of the periscope normal to the prism axis is referred to the axis of the stabilizing means normal to the level axis. This axis of the reference is hereinafter termed the cross level axis. The improved system computes the error in the angle of elevation due to relative tilt between the optical means or periscope and reference means about the cross level axis. The correction provided is in accordance with the product of the sine of twice the elevation angle and the square of the tilt angle about the cross level axis.

In the improved system, deck-tilt of the craft is resolved into two orthogonal components which are related directly to the line of sight of the periscope. The system provides single axis stabilization for the periscope sighting prism with a correction about the elevation axis for the error due to tilt of the periscope with relation to the reference about the cross level axis.

Other features and structural details of the invention will become apparent from the following detailed description of the accompanying illustrative drawings, in which:

FIGS. 1 and 2 are geometric diagrams used in explaining the cross level error for which the improved system provides correction, FIGS. 3 is a detail side elevation view of the optical means or periscope in the embodiment of the invention, wherein the stabilization component of the system is mounted in the housing of the periscope, FIG. 4 is a schematic view of the mechanism for adjusting the sighting prism of the periscope shown in FIG. 3, FIG. 5 is a detail plan view of the reticle component of the periscope shown in FIG. 3.

FIG. 6 is a composite schematic view and circuit diagram showing the relation between the system components in the embodiment of the invention is which the periscope of FIG. 3 is utilized, FIG. 6A is a detail view of the computer component of the system, FIG. 7 is a detail perspective view of the stabilization means carried by the periscope shown in FIG. 3, FIG. 8 is a view similar to FIG. 6 showing the embodiment of the invention in which the stabilizing means is mounted on a table that is slaved to a remotely located periscope, FIG. 9 is a detail side elevation partly in section of a portion of the periscope element shown in FIG. 8, and FIG. 10 is a plan view of the reticle of the periscope utilized in the embodiment of the invention shown in FIG. 8.

The error corrected by the improved system is due to tilt about the cross level axis of the sighting prism of the periscope or optical means. This error is demonstrated graphically in FIGS. 1 and 2, the first of the views showing a sphere on the surface of which the celestial body being observed is indicated as a star S. The optical components of the system including the sighting prism, the reticle on which the image of the star S is observed, and the eye piece are located at the center O of the sphere. The horizontal plane designated in FIG. 1 corresponds to the reference plane of the system provided by a level reference device such as a gyro vertical. The plane in the level condition shown with point O at the center of the sphere also corresponds to the deck plane of the craft or submarine so that the line LO which is the level axis of the sighting prism lies in the plane. A zero tilt of the level prism axis in relation to the deck plane of the craft and reference is chosen in the representation to avoid over complicating the explanation.

In observing the star S through the eye piece of the periscope, the horizontal or transverse index of the reticle is elevated above the deck plane by the elevation or altitude angle. If the horizontal and vertical indices of the reticle are projected on the surface of the sphere and extended in both directions, they will describe great circles on the sphere. These two great circles are always normal to each other. To center the image of the star S on the indices of the reticle, the periscope is adjusted about its train or slewing axis to align the vertical reticle index therein and the sighting prism is adjusted about its level axis to align the horizontal reticle index thereon.

In FIG. 1, the sighting plane of the optical means or periscope is provided by plane ZSBO in which the true elevation angle or star altitude is determined by the angle BOS. The plane is designated in the view as the vertical target plane. As shown, there is no relative tilt about the level axis LO between the horizontal reference plane and the deck plane of the craft.

With relative tilt between the optics and the reference plane about the cross tilt axis BO, the plane normal to the deck and through the reticle center is tilted away from the vertical target plane containing the actual line of sight to the star. The reticle center accordingly moves away from the target and the transverse index becomes tilted. This condition is demonstrated in FIG. 1, where the tilt between the vertical target plane and the plane Z′R′BO is designated as cross tilt angle $Z_q$. The tilt of the vertical of the craft from the horizontal reference plane occurs about the cross level axis BO with the plane Z'R'BO normal to the craft's deck plane and containing the center ray of the reticle.

The reticle center accordingly moves away from the target and the transverse index at a right angle to plane Z'R'BO becomes displaced as represented in FIG. 1 from the location R'S in the noted plane of horizontal index without cross level tilt to the location R'R in the index plane with cross level tilt. Accordingly, when the elevation angle of the body or star S is measured from a sight taken through the displaced and tilted reticle a cross level error RS is produced. This error is represented as arc RS in the curve ZB in FIG. 1. As shown in FIG. 2, with the reticle center R initially coincided with star S for zero cross level error, it now has moved over to point R' by way of path SR' which is the arc of a small circle whose pole is at B. Line RR' is the projection of the transverse index on the celestial sphere. It also is the trace on the sphere of the plane formed by the transverse or horizontal index and the eye of the observer at O. The vertical index and the observer's eye at point O form the plane Z'R'BO. When cross level tilt occurs, the horizontal index goes above star S to intersect plane ZRBO at point R. If the operator decreases the angle of the sighting prism until the index intersects ZSBO at star S, the measured elevation angle $E_b$ will be too small by the amount of the error RS. It is apparent that RR' always intersects plane ZSBO above the star point S regardless of the direction of the cross level displacement. Accordingly, the error cannot be averaged out. RS is a maximum for an elevation angle of 45 degrees, diminishing sinusoidally to zero at elevations of zero and 90 degrees respectively. Practical measurements lie between the extremes. The error is corrected in the improved system by a computer having an output in accordance with the product of the sine of twice the elevation angle and the square of the tilt angle about the axis BO as hereinafter described.

The optical components of the embodiment of the invention wherein the included stabilizing means is mounted in the housing of the periscope are particularly illustrated in FIGS. 3, 4, 6 and 7. As shown in FIG. 3, the frame of the craft or hull of the submarine is indicated at 10. Structurally, the illustrated periscope 11 includes a tubular housing 12 that is suitably mounted with respect to the hull 10 to permit the same to be raised or lowered as well as to turn or move about a slewing axis indicated at 14. Azimuth adjustment of the periscope is made about axis 14 by the observer through a slewing handle 15 provided by one or more arms extending radially of the axis of the housing 12. The essential optics of the periscope shown include an eye piece 16 situated at the lower end of the tubular housing, a reticle 17 and a sighting means or prism 18. The reticle is located in a fixed position in the upper portion of the tubular housing at the focal point of the necessary lenses between both the eye piece 16 and the sighting prism 18. The vertical index of the reticle 17 is indicated by line 19 in FIG. 5. The transverse or horizontal index of the reticle 17 is indicated by line 20.

The adjustable sighting means or prism 18 of the periscope 11 is located at the top of the tubular housing 12 adjacent a window 21 through which a celestial body such as the star S is sighted. As shown in FIG. 4, the prism 18 is suitably mounted in tube 12 for adjustment about an elevation or horizontal axis 22 that is perpendicular to the axis 14 of the periscope. Axis 22 corresponds to the noted level axis LO in FIG. 1. The tilt of the prism from a zero location determines the angle of elevation or altitude $E_b$ of the sighted star or celestial body appearing to the observer on the reticle of the periscope. With the periscope shown in FIG. 3, the sighting prism 18 may be adjusted independently of the system by the observer. The means for effecting this result as shown in FIG. 4 includes an electromagnetic clutch 24 that in operating condition in the system connects the motive means or servomotor 25 through a reduction gear train to the drive shaft 26 of the prism 18. The motion transmitting wheel 27 of the clutch 24 is movable axially along the shaft 26 by an actuating mechanism consisting of the lever 28, a solenoid with a fixed coil part 29 and an armature 30 connected to the lever. With the coil of the solenoid unenergized, a spring 31 connected to the armature 30 is normally effective through lever 28 to condition the wheel 27 so that rotation of the shaft 26 is due to operation of the motor 25. Prism adjustment independent of the system is effected by energizing the coil 29 of the solenoid of the clutch arrangement. This action moves the transmitting wheel 27 axially along the shaft 26 by operation of the armature 30 and lever 28 against the influence of spring 31 to open the clutch connection with gear 32 and close the connection with a second drive gear 34 that is moved by the operator through rotation, effected manually, of the slewing handle 15. The circuit for energizing the coil 29 of the solenoid includes an off-on switch 35 at the slewing handle of the periscope, suitable leads and a source of energy such as battery 36. Accordingly, when the operator desires to adjust the prism 18 independently of the system, he closes the switch 35 to engage the wheel 27 with the handle 15. This disengages the motor 25 from the prism and permits the adjustment to be made by rotation of the handle 15. The system is restored to normal operation when the switch 35 is opened. The connection between the handle 15 and gear 34 includes bevel gears 37, shaft 38 and gear 39.

The mechanism shown in FIG. 4 for adjusting the prism 18 about its axis 22 further includes an extension of the shaft 26 in the form of a worm or threaded shaft 40, an axially guided cam plate 41 meshing with the shaft 40, and a toothed sector plate 42 pivoted about axis 22 with an extending cam follower 43 cooperating with the plate 41. A spring 45 between the plate 42 and the housing 12 maintains the cam plate 41 and cam follower 43 in engagement. The sighting prism 18 of the arrangement is suitably fixedly connected to the plate 42 for movement about the sighting axis 22 as determined by the elevation of the cam plate 41 with relation to the shaft 40 and the consequent position of the cam follower 43. The parts are suitably mounted in the upper portion of the tube 12 of the periscope with the prism 18 adjacent the window 21 and the axis 22 normal to the slewing axis 14 of the periscope. This portion of the system also includes a synchro 46 or means providing a signal in accordance with the adjustment of the prism 18 about its elevation axis 22. The synchro 46 may be constituted of a selsyn type transmitter whose wound three phase sector 47 is fixed with relation to the tube 12 and whose rotor is drivably connected to the toothed portion of the plate 42 by a shaft 48 and suitable gearing 49. As shown in FIG. 3, the periscope is located in an elevated or raised condition with respect to the hull 10 of the submarine so that sights may be taken with the submarine submerged at periscope depth.

The improved system includes a device providing a level reference with respect to the earth such as a gyroscopic reference of the gyro vertical type shown in FIG. 7. Where the reference is incorporated in the housing of the periscope of the system as provided in the embodiment of the invention shown in FIGS. 3 through 7, inclusive, the operating parts thereof are preferably enclosed in a casing 50 that is fixedly mounted at the bottom end of the tube 12, as shown in FIG. 3. The gyroscopic reference is mounted in the housing of the periscope independently of the prism 18.

In FIG. 7, the reference device illustrated includes a stable table 51 with spaced posts 52, 53 on which a gimbal ring 54 is supported with freedom about a major axis 55. The rotor case 56 of the conventional gyro vertical is mounted on the ring 54 with freedom about a minor axis 57. Case 56 of the device includes a conventional type of gyroscopic rotor adapted to spin about a substantially vertical axis and a suitable driving means neither of which are shown in the drawing. The rotor case 56 of the arrangement is universally supported by the gimbal ring 54 with freedom in relation to table 51 about the mutually perpendicular, normally horizontal, major and minor axes 55, 57, respectively. In accordance with the described embodiment of the invention, the major axis 55 of the provided horizontal reference is mounted in the housing or located with respect to the tubular housing of the periscope in parallel relation to the axis 22 of the adjustable sighting prism 18. Gyroscopic stabilization is provided for the system only in relation to the axis 55 which is herein termed the level axis of the reference. As axis 55 is parallel to axis 22 it also may be considered to correspond to the axis LO in FIG. 1 about which the angle of elevation $E_b$ is measured. Axis 55 is accordingly related to the periscope rather than to the axes of the craft or submarine. An error in the angle $E_b$ due to relative tilt between the craft and its periscope from the horizontal plane defined by the reference device with respect to axis 55 is detected by the device by means hereinafter described.

As shown in FIG. 7, the reference device is included in a closed servo loop with mechanical components in the form of a base 58 that is suitably fixed to the bottom wall of the casing 50. The level table 51 of the reference is fixed to the lower portion at the side of a toothed wheel element 59 that is rotatably mounted on a central post 60 extending from the fixed base 58. The axis of rotation of element 59 is parallel to the level axis 55 of the reference means. Tilt of the table about its axis 55 is detected by a suitable electrical switch 61 of the liquid level type that is fixed to the side of the rotatable element 59. In the operation of the servo loop, the electrical signal output of the switch 61 is fed to a torque motor 62 by way of the connecting leads 63. Motor 62 may be a conventional device for exerting a torque about axis 57 with a wound stator element fixed to the ring 54 and a wound rotor element fixed to the rotor case 56. The resulting precession of the case 56 and ring 54 about the level axis 55 is effective to produce an output from a signal pick-off or synchro 64. The pick-off 64 may be an electrical transmitter of the selsyn type, as designated for the synchro 46, whose stator is fixed to post 53 and whose rotor is connected to the ring 54 of the reference gyroscopic device. Upon departure of the ring from a level condition with relation to axis 55, the pick-off 64 is effective to produce a corresponding signal which is utilized to operate a suitable servomotor 65 whose rotor is operatively connected to the toothed portion of the wheel 59 by way of suitable reduction gearing. Operation of the servomotor 65 by the signal fed thereto from pick-off 64 by way of leads 66 restores both the table 51 and the liquid level 61 to a tilt free condition in relation to the level axis 55 of the reference at which condition there is a null output from both the liquid level switch 61 and the pick-off 64. The cross level axis of the reference is defined by the minor axis 57 of the gyro vertical. A conventional erection control is provided for this axis of the reference, the same including a tilt detecting switch 67 of the liquid level type fixedly mounted on the case 56 whose signal output is fed by way of leads 68 to energize a torque motor 69 with a stator part fixed to the post 52 and a rotor part fixed to the gimbal ring 54.

The system includes a means producing a signal output in accordance with relative tilt of the optical means or periscope and the level reference about an axis parallel to the prism axis 22. Such means is provided by a pick-off or further electrical transmitter of the selsyn type as indicated at 70 with a rotor element connected by shafting 71 and gear 72 to the toothed wheel 59. This element provides an input into the system that is in accordance with the error in the angle $E_b$ due to tilt of the periscope and prism with relation to the reference about its major level axis 55 which is fixedly related to the prism axis 22. The system further includes a means for producing a signal in accordance with relative tilt of the optical means or periscope and the reference device about an axis normal to the prism axis 22. This signal is obtained from a further selsyn type pick-off 74 located at the minor axis of the reference, the stator of the pick-off being fixed to the ring 54 and the rotor being connected to the case 56 of the reference means. The output of the pick-off 74 is in accordance with the angle $Z_d$ in FIG. 1 with tilt about the cross level axis BO. In the described form of the invention, the reference means included in the periscope move with movement thereof about the train or slewing axis 14. The reference axes 55 and 57 accordingly always correspond to the axis LO and BO in FIG. 1 regardless of the train position of the periscope on the craft with respect to its slewing axis 14.

The corrected measure of elevation angle $E_b$ provided in the system shown in FIGS. 3 and 6 is obtained on a pointer and scale type indicating means 75 that is located on one of the side walls of the casing 50 connected to the periscope housing 12. The fixed scale index of the illustrated indicator 75 is graduated in degrees and minutes of elevation. As shown in FIG. 6, the movable pointer of the indicator is operated manually by the observer at the periscope through a hand crank 76 located on one of the side walls of the casing 50 by way of suitable shafting 77, 78. Shaft 77 also controls the electric signal output of a transmitter or synchro 79 of the same character as synchro 46 and pick-off 70, the rotor winding of the synchro 79 being moved in accordance with the movement of crank 76. An input to the rotor of the synchro 79 is obtained from a suitable source of alternating current electrical energy as indicated in FIG. 6. The three phase stators of the synchro 79 and pick-off 70 are electrically connected by suitable leads as indicated at 80. The wound rotors of the pick-off 70 and synchro 46 are electrically connected in the system by suitable leads indicated at 81. As further represented in FIG. 6, the servomotor 25 is driven by the output signal of the stator winding of the synchro 46 fed thereto by way of leads 82, amplifier 83 and leads 84. The described portion of the system functions so that servomotor 25 moves the sighting prism 18 about its axis 22 in accordance with the operation of the hand crank 76. The driving signal input to the servomotor 25 from synchro 79 is balanced by the input thereto from synchro 46 as the rotor of the synchro 46 moves due to its operative connection with the servomotor 25 provided there is no input to the system from the pick-off 70. An input to the servo-motor 25 from pick-off 70 automatically controls the sighting prism 18 to account for error in the sighting angle due to relative tilt of the optical means or periscope and level reference table about the axis 55 parallel to the prism axis 22.

From the geometrical relations illustrated in FIGS. 1 and 2, the cross level error in the system indicated by arc RS is corrected in the described embodiment by providing an input to the servomotor 25 for controlling the prism 18 in accordance with the sine of twice the elevation angle $E_b$ and the square of the noted tilt angle $Z_d$.

In FIG. 6, the computer of the system is indicated at 85. As shown in FIG. 6A, the $E_b$ input to the computer 85 is obtained from the shaft 77 which positions the rotor winding 140 of a sine resolver 141 at a shaft angle equal to twice the elevation angle, the double angle being provided by the two-to-one gearing indicated at 142. The angle $Z_d$ factor input to the computer is obtained from the signal output of the cross level error pick-off 74 by way of the leads indicated at 87. The doubling and constant factor of the computer output may be provided as shown in Fig. 6A by applying the signal to the connected grids 143, 144 of a pentagrid mixer tube 145. The squared $Z_d$ factor signal output of the tube 145 is capacitor-coupled into the stator winding 146 of the sine resolver 141 where it is multiplied with the sine factor. The output of the resolver 141 is accordingly an electrical signal of a value proportional to $$\frac{Z_d^2}{4} \times \sin 2E_b$$

that is fed to the servomotor 25 by way of lead 86, the amplifier 83 and lead 84.

In measuring corrected elevation angle $E_b$, the periscope is trained about axis 14 to the exact bearing of the body S so that the image of the body appears at the center of the reticle when the correct elevation angle is set in by hand crank 76. Level and cross level errors are corrected by the operation of the system automatically so that the visual indicating pointer as read on the fixed index or scale of indicator 75 is correct when the body is located on the horizontal index 20 of the reticle as shown in FIG. 5. The vertical spacing between the index 20 and a curved line 88 in this figure represents the correction continuously cranked into the system as an output from the computer 85 to correct for the cross level error RS. The star body in an incorrected system would appear as an image on the reticle that moves along line 88 as the tilt angle $Z_d$ changes for a given elevation angle $E_b$.

Similar elements are designated by like reference characters in the embodiment of the invention shown in FIGS. 8, 9 and 10. The system shown in these views differs from the system described in connection with FIG. 6 in that the reference component is apart from the periscope and in that the measure indicated by the system is altitude in degrees, minutes and seconds, printed on a tape rather than read on the pointer and scale type indicator 75. The clutch 24, the servomotor 25 and shaft connections therefrom to the prism 18 are also eliminated in this form of the invention. The periscope 11 shown in FIG. 8 is also minus the casing 50.

The elevation angle of the sighting prism 18 of the periscope 11 shown in FIG. 8 is adjusted by rotation of the slewing handle 15 with respect to the housing 12. This motion is directly imparted to the prism by way of connected shafting 90 and 91. A shaft 92 also connected to shaft 90 positions the rotor winding of the synchro 46 to provide an input to the system in accordance with the sighting angle $E_b$ of the prism 18. As shown, the rotor of synchro 46 is energized from a suitable alternating current source of electrical energy. With the star or body S observed at the intersection of the indices 19 and 20 on the reticle 17 in FIG. 10 by the operator of the periscope through the eye piece 16, the synchro 46 provides an electrical signal output $E_b$ that is fed amplifier 83 by way of lead 94, lead 95, the pick-off 70 and lead 96. Lead 94 interconnects the respective stators of the electrical devices 46 and 70, and the output of the rotor of pick-off 70 feeds the amplifier 83 by way of the lead 96. The input to the system from the pick-off 70 corrects the elevation data for an error due to relative tilt of the submarine, periscope and prism about the axis 22 with respect to the level axis of the reference as hereinbefore described. The necessary elevation angle input $E_b$ to the computer 85' is obtained from the synchro 46 by way of lead 97 connected to lead 94.

The separate reference means and stability providing servo loop included in this embodiment of the invention is mounted in the craft or submarine in a location that is remote from the periscope 11. As shown in Fig. 8, a separate housing as indicated at 98 is provided for this component as well as the computer 85' and amplifier 83. To maintain the spacial relation heretofore described between the level and cross level axes as defined by the reference means with regard to the prism axis 18 of the remote periscope, the physically independent periscope and reference components are interconnected by a slaving means that maintains the parallel relationship between the level axis of the reference and the prism axis of the periscope. Accordingly, the reference means provided is arranged in the craft on a table 99 with freedom about an axis 100 that is parallel to the slewing axis of the periscope 11. The base of the reference means in this instance is suitably connected in fixed relation to the rotatable table 99 which is formed to include gear teeth at its periphery that mesh with a driving gear 101. As shown in FIGS. 8 and 9, the slaving means provided includes a synchro, pick-off or electrical signal transmitter 102 of the selsyn type whose wound rotor is operatively connected to the housing tube 12 of the periscope by way of suitable gearing 104 and shaft 105. The stator of the synchro 102 is suitably fixedly connected to the hull 10 of the submarine. The stator of the synchro 102 is also energized from a suitable source of alternating current electrical energy as indicated. The slaving means further includes a suitable electrical motor 106 connected by shafting 107 to the gear 101 that is driven by the output signal of the synchro 102 fed thereto by way of lead 108 from the rotor winding of the synchro, the amplifier 109 and lead 110. A follow-back synchro 111 whose rotor is positioned by the shaft 107 in accordance with the azimuth position of the table 99 provides a second input to the amplifier 109 by way of lead 112. In the slaving arrangement provided, the table 99 is driven by the motor 106 about its axis 100 in accordance with the movement of the periscope 11 about its slewing axis 14. Parallelism between the axes 55 and 22 is accordingly maintained for any azimuth sighting position of the periscope 11.

To obtain accuracy in seconds of the corrected elevation or altitude angle, a digital type of printing recorder 114 is included in the system shown in FIG. 8. The angle measure indicated by the recorder is contained on the altitude digital wheels 115, 116 and 117 that are graduated in degrees, minutes and seconds. As shown, wheels 115, 116 and 117 are driven in the relation noted through suitable gearing and a shaft 113 by suitable motive means in the form of an electric motor 118 that receives its input by way of lead 119 from amplifier 83. To note the marking time of the observation, the recorder 114 further includes the digital hour, minutes, and seconds printing wheels 120, 121 and 122, respectively, that are driven by a suitable timing motor 123. The paper advance mechanism of the recorder 114 is indicated at 124. The observer effects operation of the recorder to print the altitude and time information when the body or star S appears as shown in FIG. 10 at the intersection of the indices 19 and 20 by closing a switch 125 at the periscope 11. This operation closes an electrical circuit including an energy source 126, lead 127, switch 125, and lead 128 to the printing solenoids 129 and 130 for the respective altitude and time data wheels.

In operation of the system shown in FIG. 8, the periscope is first moved about its train axis 14 to the exact bearing of the sighted object so that the image of the object S appears at the center of the reticle when the handle is rotated to move the sighting prism 18 to change its elevation angle. The observer operates the mark switch 125 when the star image crosses, or coincides with the horizontal index 20 of the reticle whether it is at the center thereof as depicted in FIG. 10 or not. While the observation at the periscope is in error, the system cranks in the necessary corrections through the pick-off 70, computer 85' and motor 118 so that the wheels 115, 116, 117 are properly conditioned to print the corrected measure of the angle of elevation of the body as the switch 125 is closed to effect operation of the recorder.

While the invention has been described in its preferred embodiments, it is to be understood that the words which have been used are words of description rather than of limitation and that changes within the purview of the appended claims may be made without departing from the

What is claimed is:

1. A stabilized system providing a corrected measure of the angle of elevation of a celestial body from a sighting point including optical means having a reticle on which an image of the body is observed, a prism adjustable about an elevation axis for sighting the body, and means providing a signal in accordance with the adjustment of the prism about its axis; a device providing a level reference with respect to the Earth including first means producing a signal in accordance with relative tilt of the optical means and the level reference device about an axis parallel to the prism axis, and second means producing a signal in accordance with relative tilt of the optical means and the level reference device about an axis normal to the prism axis; a computer receiving the signal of said second reference signal means and an input in accordance with the elevation angle of the prism providing a corrective output in accordance with the sine of twice the elevation angle and the square of the signal of said second reference signal means; and means responsive to the output of said computer and the signals of said prism signal means and first reference signal means operable to measure corrected elevation angle upon observation of the body on the reticle of the optical means.

2. A stabilized system providing a corrected measure of the angle of elevation of a celestial body from a sighting point including optical means having a reticle on which an image of the body is observed, a prism adjustable about an elevation axis for sighting the body, and means providing a signal in accordance with the adjustment of the prism about its axis; a device providing a level reference with respect to the Earth including first means producing a signal in accordance with relative tilt of the optical means and the level reference device about an axis parallel to the prism axis, and second means producing a signal in accordance with relative tilt of the optical means and the level reference device about an axis normal to the prism axis; a computer receiving the signal of said second reference signal means and an input in accordance with the elevation angle of the prism providing a corrective output in accordance with the sine of twice the elevation angle and the square of the signal of said second reference signal means; and means for indicating corrected elevation angle upon observation of the body on the reticle of the optical means including motive means operatively connected to said prism signal means responsive to the signals of said prism signal means, said first reference signal means and the output of said computer.

3. A stabilized system providing a corrected measure of the angle of elevation of a celestial body from a sighting point including optical means having a reticle on which an image of the body is observed, a prism adjustable about an elevation axis for sighting the body, and means providing a signal in accordance with the adjustment of the prism about its axis; a device providing a level reference with respect to the Earth including first means producing a signal in accordance with relative tilt of the optical means and the level reference device about an axis parallel to the prism axis, and second means producing a signal in accordance with relative tilt of the optical means and the level reference device about an axis normal to the prism axis; a computer receiving the signals of said prism signal means, said first reference signal means and said second reference signal means providing a corrective output in accordance with the sine of twice the elevation angle and the square of the signal of said second reference signal means, motive means driven by the output of said computer, the signal of said prism signal means and the signal of said first reference signal means, and means for indicating corrected elevation angle upon observation of the body on the reticle of the optical means operatively connected to said motive means.

4. A stabilized system providing a corrected measure of the angle of elevation of a celestial body from a submarine including a periscope having a reticle on which an image of the body is observed, a prism adjustable about an elevation axis for sighting the body, and means providing a signal in accordance with the adjustment of the prism about its axis; a gyro vertical having an axis parallel to the prism axis and an axis normal to the prism axis including signal means for detecting tilt about the parallel axis and for detecting tilt about the normal axis; a computer receiving the signal of said normal signal means and an input in accordance with the elevation angle of the prism providing a corrective output in accordance with the sine of twice the elevation angle and the square of the signal of said normal signal means; and means responsive to the output of said computer and the signals of said prism means and parallel axis signal means operable to indicate corrected elevation angle upon observation of the body on the reticle of the periscope.

5. In a stabilized system providing a corrected measure of the angle of elevation of a celestial body from a submarine, a periscope having a reticle on which an image of the body is observed, a prism adjustable about an elevation axis for sighting the body, and means providing a signal in accordance with the adjustment of the prism about its axis; a gyro vertical reference having a major axis arranged in parallel relation to the prism axis and a minor axis normal to the prism axis, a pick-off providing a signal in accordance with relative tilt between the periscope and the reference in relation to the major axis of the reference, a pick-off providing a signal in accordance with relative tilt between the periscope and the reference in relation to the minor axis of the reference; a computer receiving the signal of said minor axis pick-off and an input in accordance with the elevation angle of the prism providing a corrective output in accordance with the sine of twice the elevation angle and the square of the signal of the minor axis pick-off; and motive means operatively connected to said prism signal means responsive to the signals of said prism signal means, said major axis pick-off and the output of said computer.

6. A stabilized system providing a corrected measure of the angle of elevation of a celestial body from a submarine including a periscope having a reticle on which an image of the body is observed, a prism adjustable about an elevation axis for sighting the body, and means providing a signal in accordance with the adjustment of the prism about its axis; a gyro vertical reference having a major axis arranged in parallel relation to the prism axis and a minor axis normal to the prism axis, a pick-off providing a signal in accordance with relative tilt between the persicope and the reference in relation to the major axis of the reference, a pick-off providing a signal in accordance with relative tilt between the periscope and the reference in relation to the minor axis of the reference; a computer receiving the signal of said minor axis pick-off and an input in accordance with the elevation angle of the prism providing a corrective output in accordance with the sine of twice the elevation angle and the square of the signal of the minor axis pick-off, motive means responsive to the signals of said prism signal means, said major axis pick-off and the output of said computer, and means for providing a measure of the corrected elevation angle upon observation of the body on the reticle of the periscope operatively connected to said motive means.

7. In a system of the character described, the combination of optical means mounted on a dirigible craft having a prism adjustable about an elevation axis, means providing an output in accordance with the elevation angle of the prism, a gyroscopic reference mounted on the craft having a level axis located in parallel relation to the prism axis and a cross level axis, a pick-off providing a signal in accordance with relative tilt about the cross level axis between the craft and the reference, means operatively connected to said pick-off and said elevation angle output means for computing the sine of twice the elevation angle of the prism and the square of the signal output of said pick-off, and a motor operable by the output of said computer to correct the system for tilt of the craft with relation to the reference about the cross level axis.

8. A system of the chaarcter claimed in claim 7, in which the optical means is a periscope having a housing, the prism is pivotally mounted in the housing for adjustment about its elevation axis, and the gyroscopic reference is mounted in the housing of the periscope independently of the prism with its level axis arranged in parallel relation to the prism axis.

9. A system of the character claimed in claim 7, in which the optical means is a periscope movable about a slewing axis with relation to the craft, the prism is pivotally mounted in the periscope for adjustment about its elevation axis, the gyroscopic reference is mounted on the craft at a location remote from the periscope on a table with freedom about an axis parallel to the slewing axis of the periscope, and including means for slaving the reference to the periscope about the table axis to maintain the parallel relationship between the level axis of the reference and the prism axis of the periscope.

10. In a system of the character described, the combination of a periscope having a housing movable about a slewing axis including a prism adjustable about an axis, to a sighting angle of elevation, a gyroscopic reference of the vertical type having a housing apart from the periscope housing and major and minor axes, means for mounting said reference for movement about an axis parallel to the slewing axis of the periscope, means interconnecting said reference and periscope for slaving said reference about its parallel mounting axis to maintain the major axis of the reference in parallel relation to the prism axis of the periscope, means operatively connected to said prism and said gyroscopic reference for computing the error in the angle of elevation of said prism due to relative tilt between the prism and reference about its major axis, and means responsive to said computing means for correcting the sytem.

11. In a system of the character described, an optical device having a reticle on which the image of a celestial body is observed and means adjustable about an axis for sighting the body at an angle of elevation, a gyro vertical independent of said sighting means having a level axis located in parallel relation to the elevation axis of the sighting means and a cross level axis normal to the level axis, means operatively connected to the gyro vertical and optical device for computing the error in the angle of elevation of said sighting means due to relative tilt between the sighting means and vertical about the cross level axis, and means responsive to said computing means for correcting the system.

12. In a system of the character described, a periscope having a slewing axis and a sighting prism adjustable about an elevation axis, means providing an output in accordance with the angle of elevation of the prism; a device independent of the sighting prism of the periscope providing a level reference with respect to the Earth having a level axis located in parallel relation to the prism axis and a cross level axis; means operatively connected to the reference and prism output means for computing the error in the angle of elevation of said prism due to relative tilt between the periscope and reference about the cross level axis; and means operatively connected to said computing means for correcting the system.

13. A system of the character described in claim 12, in which the computing means produces an output in accordance with the product of the sine of twice the elevation angle and the square of the tilt angle about the cross level axis.

14. A system of the character claimed in claim 12, in which the periscope includes a housing, and the reference is a gyro vertical with its major axis located in the housing in parallel relation to the prism axis.

15. A system of the character claimed in claim 12, in which the periscope includes a housing and the reference is a gyro stabilized table having an axis located in the housing normal to slewing axis of the periscope and parallel to the axis of the sighting prism.

16. A system of the character claimed in claim 12, in which the reference is a gyro vertical mounted on a table having freedom about an axis parallel to the slewing axis of the periscope, and including means for slaving the reference to the periscope about the table axis to maintain the parallel relationship between the level axis of the reference and the prism axis of the periscope.

References Cited in the file of this patent
UNITED STATES PATENTS

| | | |
|---|---|---|
| 1,955,746 | Inglis | Apr. 24, 1934 |
| 2,409,648 | Van Auken et al. | Oct. 22, 1946 |
| 2,762,123 | Schultz et al. | Sept. 11, 1956 |

FOREIGN PATENTS

| | | |
|---|---|---|
| 474,890 | Germany | Apr. 13, 1929 |